United States Patent
Murakami

(10) Patent No.: US 11,499,725 B2
(45) Date of Patent: Nov. 15, 2022

(54) HOT WATER SUPPLY DEVICE

(71) Applicant: DENSO WAVE INCORPORATED, Chita-gun (JP)

(72) Inventor: Youtarou Murakami, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 17/345,575

(22) Filed: Jun. 11, 2021

(65) Prior Publication Data

US 2022/0003430 A1  Jan. 6, 2022

(30) Foreign Application Priority Data

Jul. 3, 2020 (JP) .............................. JP2020-115653

(51) Int. Cl.
*G05D 23/13* (2006.01)
*F24D 19/10* (2006.01)
*G05D 7/06* (2006.01)
*G05D 23/19* (2006.01)
*F24D 17/00* (2022.01)

(52) U.S. Cl.
CPC ..... *F24D 19/1051* (2013.01); *F24D 17/0078* (2013.01); *G05D 7/0682* (2013.01); *G05D 23/1917* (2013.01)

(58) Field of Classification Search
CPC .. G05D 23/00; G05D 23/1858; G05D 7/0682; G05D 23/1917; F16K 19/00; F24D 19/1051; F24D 17/0078
See application file for complete search history.

(56) References Cited

U.S. PATENT DOCUMENTS

| | | | |
|---|---|---|---|
| 4,711,392 A * | 12/1987 | Kidouchi | F16K 11/20 137/625.33 |
| 5,331,996 A | 7/1994 | Ziehm | |
| 5,572,985 A | 11/1996 | Benham | |
| 6,601,773 B2 * | 8/2003 | Saitoh | F24H 9/2007 165/140 |
| 9,122,284 B2 * | 9/2015 | Ferguson | G05D 23/1917 |
| 9,244,466 B2 * | 1/2016 | DuPlessis | F24D 17/0031 |
| 9,260,844 B2 * | 2/2016 | Peel | E03C 1/055 |
| 10,088,851 B2 * | 10/2018 | Huck | G05D 23/1925 |
| 2018/0274792 A1 * | 9/2018 | Shaffer | F24H 9/2007 |
| 2020/0056791 A1 * | 2/2020 | Collins | F24D 17/0078 |

FOREIGN PATENT DOCUMENTS

JP   08232326 A  *  9/1996

* cited by examiner

*Primary Examiner* — Gregory A Wilson
(74) *Attorney, Agent, or Firm* — Oliff PLC

(57) ABSTRACT

A hot water supply device includes a heater, a water channel, a mixing valve unit, and a circulation mechanism. The mixing valve unit has a valve member and a drive unit configured to drive the valve member to change a mixing ratio of supply water heated by the heater and unheated water. The circulation mechanism has: a connection passage that connects the water channel to the heater by being branched from a part of the water channel between the mixing valve unit and the heater; an on-off valve that opens and closes the connection passage; and a pump configured to return the supply water remaining in the water channel through the connection passage to the heater. A drive amount acquisition unit acquires a drive amount of the drive unit, and a controller controls the circulation mechanism based on the drive amount acquired by the drive amount acquisition unit.

4 Claims, 4 Drawing Sheets

HOT WATER SUPPLY DEVICE

CROSS REFERENCE TO RELATED APPLICATION

This application is based on Japanese Patent Application No. 2020-115653 filed on Jul. 3, 2020, the disclosure of which is incorporated herein by reference in its entirety.

TECHNICAL FIELD

The present disclosure relates to a hot water supply device.

BACKGROUND

A hot water supply device mixes a supply water heated by a heater with unheated water such as tap water at each facility to supply a mixed water with a desired temperature.

SUMMARY

According to an aspect of the present disclosure, a hot water supply device includes a heater, a water channel through which a supply water heated by the heater flows, a mixing valve unit, a circulation mechanism, a drive amount acquisition unit, and a controller. The mixing valve unit is disposed in the water channel, and has a valve member and a drive unit configured to drive the valve member so as to change a mixing ratio of the supply water and unheated water not heated by the heater to produce mixed water with a preset temperature. The circulation mechanism is disposed in the water channel. The circulation mechanism has: a connection passage that connects the water channel to the heater by being branched from a part of the water channel between the mixing valve unit and the heater; an on-off valve that opens and closes the connection passage; and a pump configured to return the supply water remaining in the water channel through the connection passage to the heater. The drive amount acquisition unit acquires a drive amount of the drive unit. The controller controls the circulation mechanism based on the drive amount acquired by the drive amount acquisition unit.

DESCRIPTION OF EMBODIMENT

Figure 1:
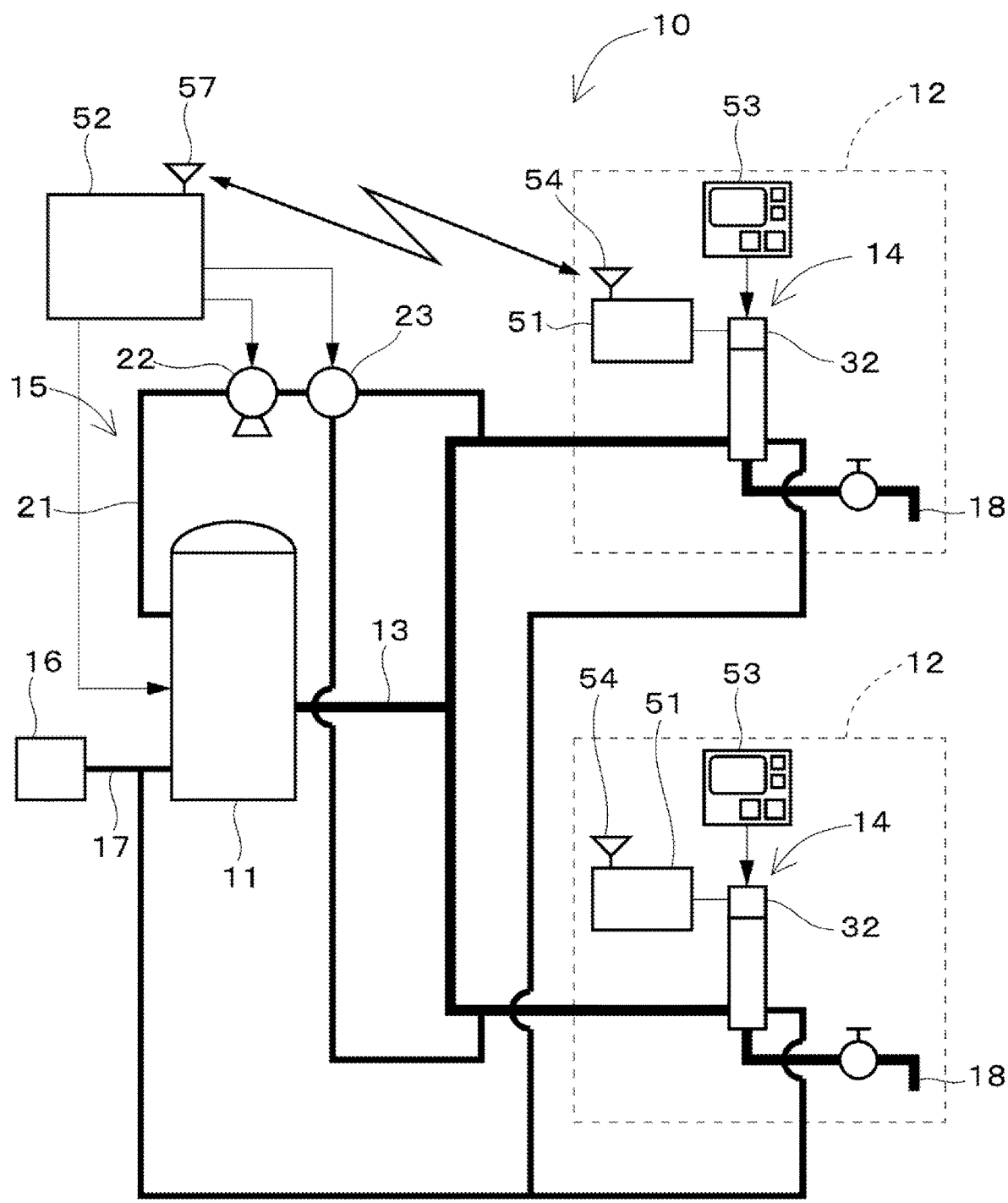
FIG. 1 is a schematic view showing a hot water supply device according to an embodiment.

Conventionally, a hot water supply device is known, which supplies water having a preset temperature to each facility in a building. The hot water supply device uses electricity or gas to generate supply water heated by a heater, and mixes the heated water with unheated water that is not heated by a heater such as tap water at each facility to supply the mixed water having the desired temperature. The supply water and the unheated water are mixed by a mixing valve unit provided for each facility in a water channel defined from the heater to the discharge port. The mixed water having the preset temperature is generated by changing the mixing ratio. The mixing valve unit is provided in the middle of the water channel defined from the heater to the facility. Therefore, the temperature of the supply water remaining in the water channel decreases with the passage of time. When the temperature of the supply water in the water channel is lowered in this way, the mixed water having the preset temperature may not be able to be used at a desired timing. In this case, a temperature sensor is provided in the vicinity of the mixing valve unit to detect the temperature of the supply water remaining in the water channel. In such a hot water supply device, the supply water remaining in the water channel is circulated to the heater and reheated based on the temperature of the supply water detected by the temperature sensor.

However, in this case, the temperature sensor is required at a position close to the mixing valve unit. The mixing valve unit is generally provided in a facility such as a kitchen or a bathroom away from the heater. Therefore, in the case of an existing hot water supply device, it is difficult to carry out the work for providing the temperature sensor if there is not enough space in the vicinity of the mixing valve unit. Further, it is difficult to conduct the maintenance of the temperature sensor. In addition, it is necessary to connect the temperature sensor to a controller that controls the heater and the circulation of the supply water, which also causes difficulty in the work and the maintenance.

The present disclosure provides a hot water supply device that can detect the temperature of the supply water in the vicinity of the mixing valve unit with high accuracy, without additional component, and that can be applied to an existing equipment easily in the work and the maintenance.

According to an aspect of the present disclosure, the hot water supply device includes a drive amount acquisition unit. The drive amount acquisition unit detects the drive amount of the drive unit that drives the valve member in the mixing valve unit. The valve member of the mixing valve unit is driven by the drive unit to change the mixing ratio of the supply water and the unheated water. Therefore, the drive amount of the drive unit correlates with the movement amount of the valve member. That is, the drive amount of the drive unit correlates with the mixing ratio of the supply water and the unheated water, and the temperature of the supply water. That is, the drive amount acquisition unit indirectly acquires the temperature of the supply water from the drive amount of the drive unit. The controller estimates the temperature of the supply water in the mixing valve unit from the drive amount of the drive unit acquired by the drive amount acquisition unit, and controls the circulation mechanism including the pump that returns the supply water from the water channel to the heater. The mixing valve unit is also provided in the existing hot water supply device, and the drive unit is also provided for driving the valve member. Therefore, the temperature of the supply water in the mixing valve unit is obtained from the drive unit of the existing mixing valve unit without adding a new member. Further, since the mixing valve unit is provided so as to be exposed to outside, the work and the maintenance are easy. Then, the temperature acquisition unit acquires the temperature of the supply water in the mixing valve unit from the drive amount of the drive unit. Therefore, the temperature of the supply water in the vicinity of the mixing valve unit can be detected with high accuracy, without the need for additional parts, while being applied to an existing equipment easily in the work and the maintenance.

Hereinafter, a hot water supply device according to an embodiment will be described with reference to the drawings.

As shown in FIG. 1, a hot water supply device 10 is used in a structure such as a house or building. The hot water supply device 10 includes a heater 11 and supplies mixed water having a preset temperature to one or more facilities 12 set in the structure. The facility 12 corresponds to a place where mixed water is required, such as a bathroom, a washroom, a kitchen, and a pantry in the structure.

The hot water supply device 10 includes a water channel 13, a mixing valve unit 14, a circulation mechanism 15 in addition to the heater 11. The heater 11 is supplied with unheated water from a supply source 16. The supply source 16 supplies unheated water from, for example, waterworks or well. The unheated water is supplied from the supply source 16 and is in a state where the temperature is not adjusted by the heater 11 or the other equipment. The supply source 16 and the heater 11 are connected with each other by unheated water channel 17. The heater 11 heats the water supplied via the unheated water channel 17. The heater 11 heats water using, for example, combustion of gas or kerosene, electricity, or the like. As a result, the heater 11 produces the supply water heated to have a temperature higher than the water supplied from the supply source 16.

The supply water generated by the heater 11 flows through the water channel 13. The water channel 13 connects the heater 11 to one or more facilities 12. The water channel 13 is branched at the middle in order to supply the supply water generated by the heater 11 to one or more facilities 12. The water channel 13 may extend directly from the heater 11 to each of the facilities 12 so as to individually connect the heater 11 to the facilities 12.

The mixing valve unit 14 is provided in each of the facilities 12. The mixing valve unit 14 is provided in the water channel 13 extending from the heater 11. That is, when there are two or more facilities 12, the mixing valve unit 14 is provided in each of the water channels 13 connected to the facilities 12. The mixing valve unit 14 may be provided not only individually for the two or more facilities 12, but also collectively for an arbitrary number of facilities 12. The water channel 13 has a discharge port 18 at the end opposite to the heater 11 so as to discharge water. The mixing valve unit 14 is provided between the heater 11 and the discharge port 18 in the water channel 13. The mixing valve unit 14 is connected to the unheated water channel 17 in addition to the water channel 13. As a result, the mixing valve unit 14 mixes the heated supply water supplied from the heater 11 and the unheated water supplied from the supply source 16 without being heated by the heater so as to provide a mixed water having a set temperature Td set in advance. The mixed water generated by mixing the supply water and the unheated water in the mixing valve unit 14 is discharged from the discharge port 18 of each of the facilities 12 through the water channel 13. The details of the mixing valve unit 14 will be described later.

The circulation mechanism 15 has a connection passage 21 and a pump 22. The connection passage 21 branches from the water channel 13 and connects the water channel 13 to the heater 11. The connection passage 21 branches from the water channel 13 at a position between the heater 11 and the mixing valve unit 14. That is, the connection passage 21 branches on the upstream side of the mixing valve unit 14 in the supply direction of the supply water from the heater 11. Further, when the water channel 13 branches to the facilities 12, the connection passage 21 may branch from each of the water channels 13 or may branch from the water channel 13 before branching to the facility 12. The circulation mechanism 15 has an on-off valve 23 that opens and closes the connection passage 21. The pump 22 returns the supply water of the water channel 13 to the heater 11 through the connection passage 21. That is, the circulation mechanism 15 opens the on-off valve 23 in the connection passage 21 and drives the pump 22 to circulate the supply water remaining in the water channel 13 to the heater 11. In order to properly reheat the supply water of the water channel 13, the connection passage 21 preferably branches from the water channel 13 at a position closer to the mixing valve unit 14.

Figure 2:
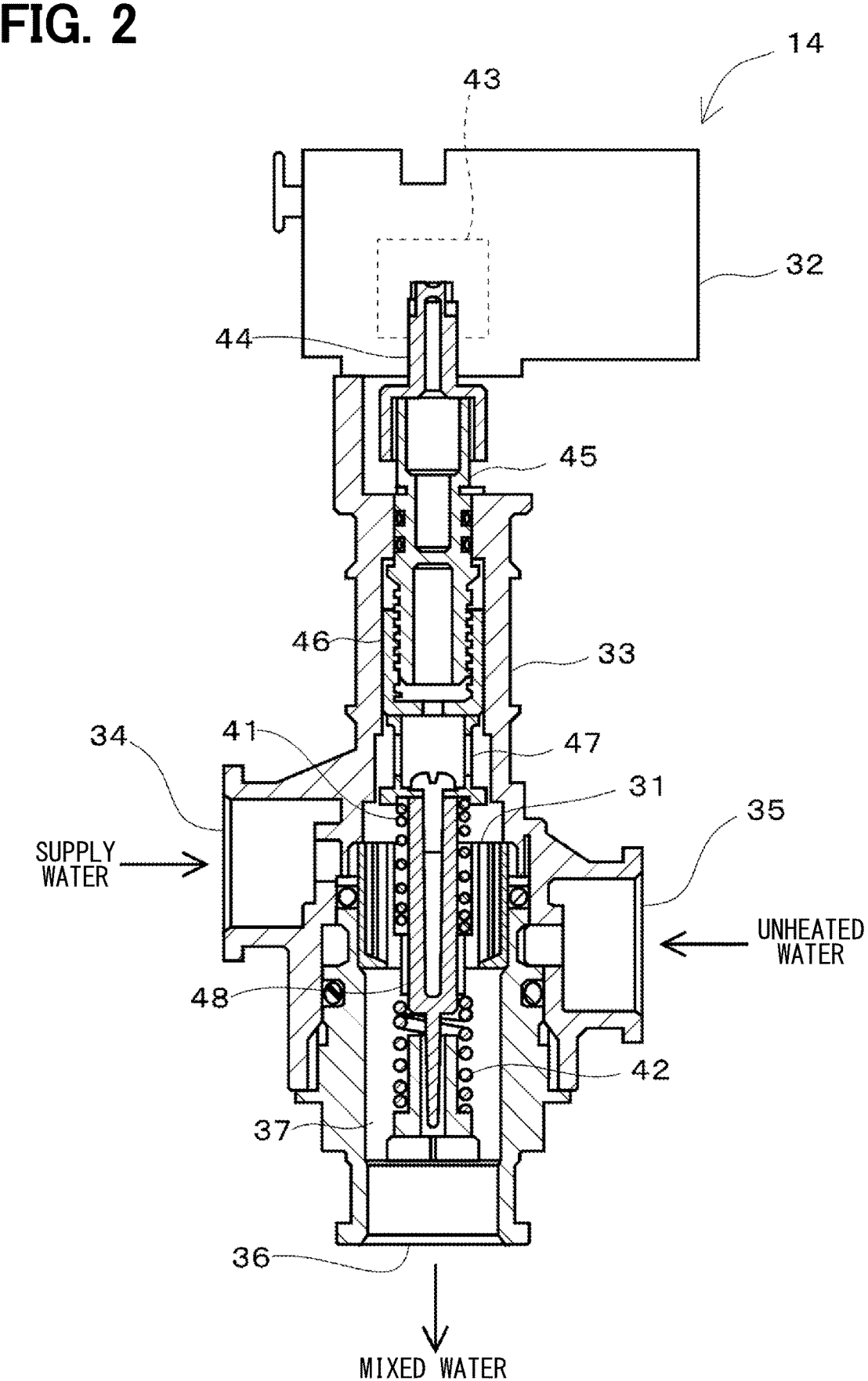
FIG. 2 is a schematic cross-sectional view showing a mixing valve unit of the hot water supply device of the embodiment.

As shown in FIG. 2, the mixing valve unit 14 has a valve member 31 and a drive unit 32. The valve member 31 reciprocates in the axial direction inside a sleeve 33. The sleeve 33 has a supply water inlet 34, an unheated water inlet 35, and a mixed water outlet 36. The supply water inlet 34 and the unheated water inlet 35 penetrate the sleeve 33 in the radial direction. The supply water inlet 34 is connected to the water channel 13, and the supply water flows in the supply water inlet 34 from the heater 11. The unheated water inlet 35 is connected to the unheated water channel 17, and the unheated water flows in the unheated water inlet 35 from the supply source 16. The mixed water outlet 36 is provided at one end of the sleeve 33 in the axial direction. The mixed water outlet 36 is connected to the water channel 13, and the mixed water flows out of the discharge port 18 through the water channel 13.

The sleeve 33 has a mixed water channel 37 on the inner peripheral side. The mixed water channel 37 is connected to each of the supply water inlet 34 and the unheated water inlet 35, and the end of the mixed water channel 37 is connected to the mixed water outlet 36. The valve member 31 changes the mix ratio of the supply water flowing from the supply water inlet 34 to the unheated water flowing from the unheated water inlet 35 in the mixed water channel 37, by moving inside the sleeve 33 in the axial direction. That is, the valve member 31 changes the opening areas of the supply water inlet 34 and the unheated water inlet 35 by moving in the sleeve 33 in the axial direction. As a result, the temperature of the mixed water mixed in the mixed water channel 37 is adjusted, and the temperature-adjusted mixed water flows out of the mixed water outlet 36 to the discharge port 18.

The mixing valve unit 14 has a first elastic member 41 and a second elastic member 42 that apply force to the valve member 31. The first elastic member 41 is a spring member having a fixed elastic constant, and presses the valve member 31 toward the mixed water outlet 36. The second elastic member 42 is a spring member formed of a shape memory alloy whose elastic constant changes with temperature, and presses the valve member 31 in the direction opposite to that of the first elastic member 41.

The mixing valve unit 14 has a drive unit 32. The drive unit 32 includes a motor 43, a rotatable member 44, an adjusting member 45, a movable member 46, a collar member 47, and a shaft member 48. The motor 43 generates a rotational driving force. The rotational force of the motor 43 is transmitted to the adjusting member 45 through the rotatable member 44, and the adjusting member 45 rotates about the axis of the sleeve 33. The adjusting member 45 is thread-engaged with the movable member 46. As a result, the rotation of the adjusting member 45 is converted into the movement of the movable member 46 in the axial direction of the sleeve 33. The end of the movable member 46 on the opposite side of the motor 43 is in contact with the collar member 47. The collar member 47 is connected to the shaft member 48 at the end opposite to the adjusting member 45 and is in contact with the first elastic member 41. As the motor 43 rotates, the rotatable member 44 rotates together with the adjusting member 45. Then, as the adjusting member 45 rotates, the movable member 46 thread-engaged with the adjusting member 45 moves in the axial direction of the sleeve 33. The movement of the movable member 46 is transmitted to the shaft member 48 through the collar member 47. As a result, when the motor 43 rotates forward or reverse in the rotation direction, the collar member 47 and the shaft member 48 reciprocate in the axial direction of the sleeve 33.

One end of the first elastic member 41 is in contact with the valve member 31, and the other end of the first elastic member 41 is in contact with the collar member 47. As a result, the first elastic member 41 presses the valve member 31 toward the mixed water outlet 36. The first elastic member 41 is in contact with the collar member 47 that is moved in the axial direction of the sleeve 33 by the rotation of the motor 43. Therefore, the force of the first elastic member 41 pressing the valve member 31 is adjusted by the rotation of the motor 43. That is, when the collar member 47 is moved downward by the rotation of the motor 43, the first elastic member 41 is compressed, and the pressing force of the first elastic member 41 increases. On the other hand, when the collar member 47 is moved upward by the rotation of the motor 43, the compression of the first elastic member 41 is reduced, and the pressing force of the first elastic member 41 is reduced.

One end of the second elastic member 42 is in contact with the valve member 31, and the other end of the second elastic member 42 is in contact with the end of the sleeve 33 adjacent to the mixed water outlet 36. As a result, the second elastic member 42 presses the valve member 31 to the side opposite to the mixed water outlet 36. Since the second elastic member 42 is made of a shape memory alloy, the second elastic member 42 expands or contracts depending on the temperature of the mixed water, and the pressing force of the second elastic member 42 changes. Thus, the valve member 31 stops at a position where the pressing force of the first elastic member 41 adjusted by the drive unit 32 and the pressing force of the second elastic member 42 adjusted by the temperature of the mixed water are balanced. As a result, the opening area of the supply water inlet 34 into which the supply water flows and the opening area of the unheated water inlet 35 into which the unheated water flows are adjusted, and the mixing ratio of the supply water and the unheated water is adjusted. The mixed water having the desired set temperature flows out from the mixed water outlet 36. The configuration of the mixing valve unit 14 described above is an example and is not limited to the example, and the shape, structure, configuration, etc. of each portion can be arbitrarily changed while generating mixed water from the supply water and the unheated water.

In addition to the above configuration, as shown in FIG. 1, the hot water supply device 10 includes a drive amount acquisition unit 51, a controller 52, and an input panel 53. The drive amount acquisition unit 51 is connected to the drive unit 32 of the mixing valve unit 14. The drive amount acquisition unit 51 acquires the drive amount of the drive unit 32 in the mixing valve unit 14. In this embodiment, the drive amount acquisition unit 51 acquires the load of the motor 43. The load of the motor 43 can be arbitrarily set in, for example, the voltage applied to the motor 43, the current supplied to the motor 43, the rotation speed and the rotation angle of the motor 43, and the like. The mixing valve unit 14 has a communication unit 54 that outputs the drive amount acquired by the drive amount acquisition unit 51. The drive amount acquisition unit 51 and the communication unit 54 are provided in the mixing valve unit 14.

Figure 3:
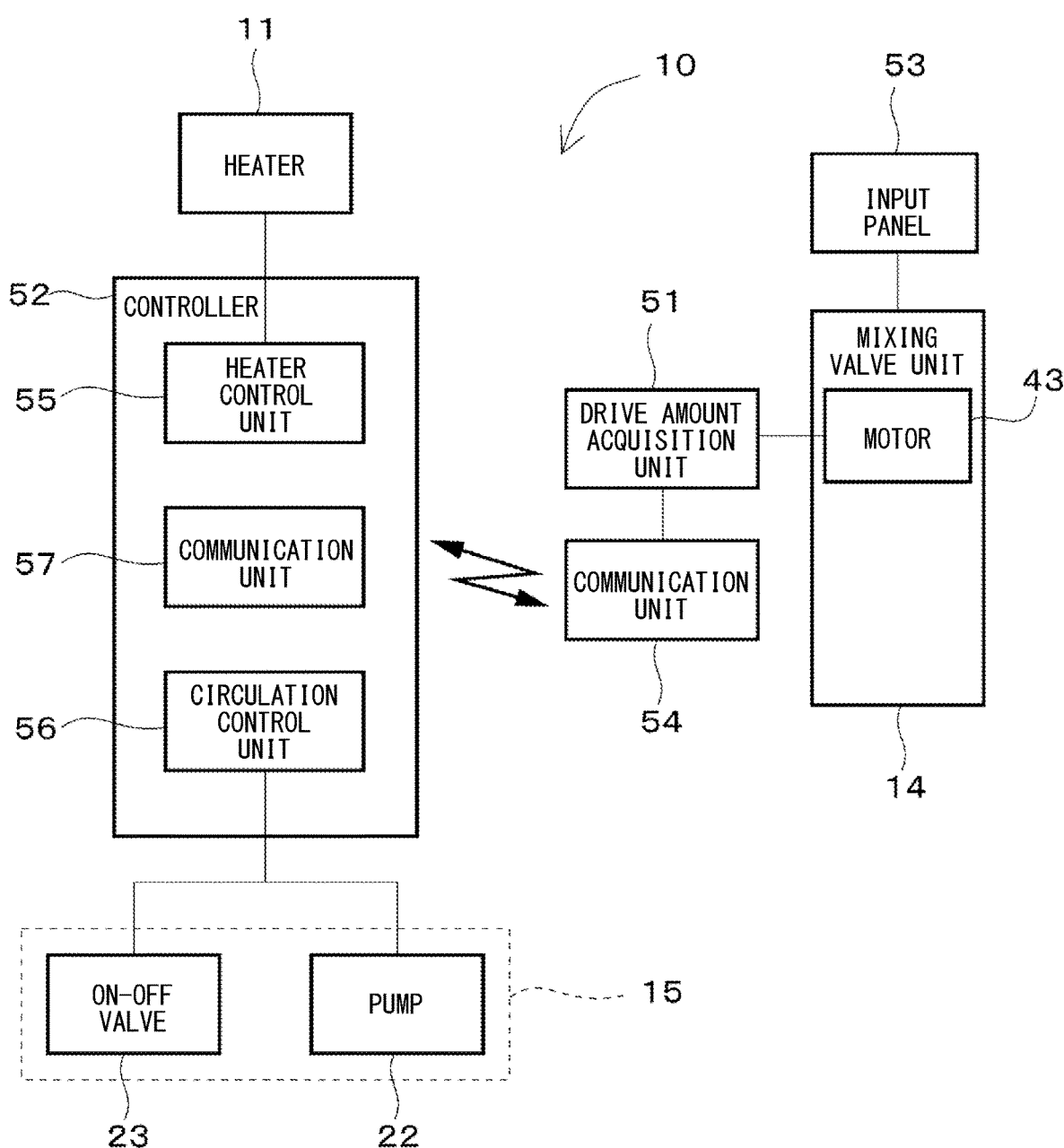
FIG. 3 is a block diagram showing the hot water supply device of the embodiment.

The controller 52 is a computer that controls the entire hot water supply device 10. The controller 52 has a CPU and storage media such as ROM and RAM (not shown), and controls the hot water supply device 10 by executing a computer program. As shown in FIG. 3, the controller 52 realizes the heater control unit 55 and the circulation control unit 56 by software by executing a computer program. The heater control unit 55 and the circulation control unit 56 may be realized not only in terms of software but also in terms of hardware, or may be realized by collaboration between software and hardware. Further, the controller 52 has a communication unit 57 that communicates with the communication unit 54 of the mixing valve unit 14.

The drive amount acquisition unit 51 outputs the load of the motor 43 in the mixing valve unit 14 to the controller 52 as an electric signal. In this case, the drive amount acquisition unit 51 outputs the acquired electric signal to the communication unit 57 of the controller 52 through the communication unit 54. The heater control unit 55 is connected to the heater 11 to control the heater 11 so as to control the temperature of water. The circulation control unit 56 is connected to the pump 22 and the on-off valve 23 of the circulation mechanism 15. The circulation control unit 56 controls the on-off valve 23 to control the connection/disconnection between the water channel 13 and the connection passage 21 and controls the operation of the pump 22. The communication unit 54 of the mixing valve unit 14 and the communication unit 57 of the controller 52 are wirelessly connected with each other by, for example, WiFi (registered trademark) or Bluetooth (registered trademark).

The input panels 53 is provided in each of the facilities 12, and receives inputs such as the temperature of the mixed water discharged from the discharge port 18. The user inputs a desired temperature of the mixed water through the input panel 53. The input panel 53 is connected to the mixing valve unit 14. The mixing valve unit 14 is controlled based on the set temperature Td input from the input panel 53. The mixing valve unit 14 may be configured to be controlled by the controller 52. In this case, the controller 52 controls the heater 11 and the mixing valve unit 14 based on the set temperature Td input from the input panel 53.

The drive amount of the motor 43 in the drive unit 32 of the mixing valve unit 14 changes based on the set temperature Td input from the input panel 53, the temperature Ts of the supply water, and the temperature Tn of the unheated water. The valve member 31 of the mixing valve unit 14 is moved inside the sleeve 33 to a position where the temperature of the mixed water flowing out from the mixed water outlet 36 becomes to have the set temperature Td. The position of the valve member 31 is determined by the temperature Ts of the supply water and the temperature Tn of the unheated water based on the set temperature Td. The temperature Ts of the supply water and the temperature Tn of the unheated water are not always constant. Therefore, even if the set temperature Td is constant, the position of the valve member 31 changes, and the load of the motor 43 of the drive unit 32 that drives the valve member 31 also changes. The load of the motor 43 correlates with the temperature Ts of the supply water. Therefore, the drive amount acquisition unit 51 acquires and outputs the load of the motor 43 to the controller 52.

Next, the operation of the hot water supply device 10 according to the embodiment will be described.

Since the water channel 13 connecting the heater 11 and the mixing valve unit 14 is provided in the building, the water channel 13 has a predetermined overall length and is exposed to outside air having a temperature lower than the temperature Ts of the supply water heated by the heater 11. Therefore, the temperature Ts of the supply water that is not used and remains in the water channel 13 decreases with the passage of time. When the temperature Ts of the supply water decreases, the mixing valve unit 14 cannot generate the mixed water having the set temperature Td, and the mixed water having a temperature lower than the set temperature Td is discharged from the discharge port 18. Therefore, the circulation mechanism 15 circulates the supply water remaining in the water channel 13 to the heater 11 and reheats the supply water. Specifically, when the temperature Ts of the supply water remaining in the water channel 13 falls below a preset minimum temperature Ti, the circulation mechanism 15 circulates the supply water remaining in the water channel 13 to the heater 11. As described above, the drive amount of the motor 43 of the mixing valve unit 14 correlates with the temperature Ts of the supply water. Therefore, in the present embodiment, the temperature Ts of the supply water in the water channel 13 is acquired from the motor 43 of the drive unit 32 of the mixing valve unit 14.

Figure 4:
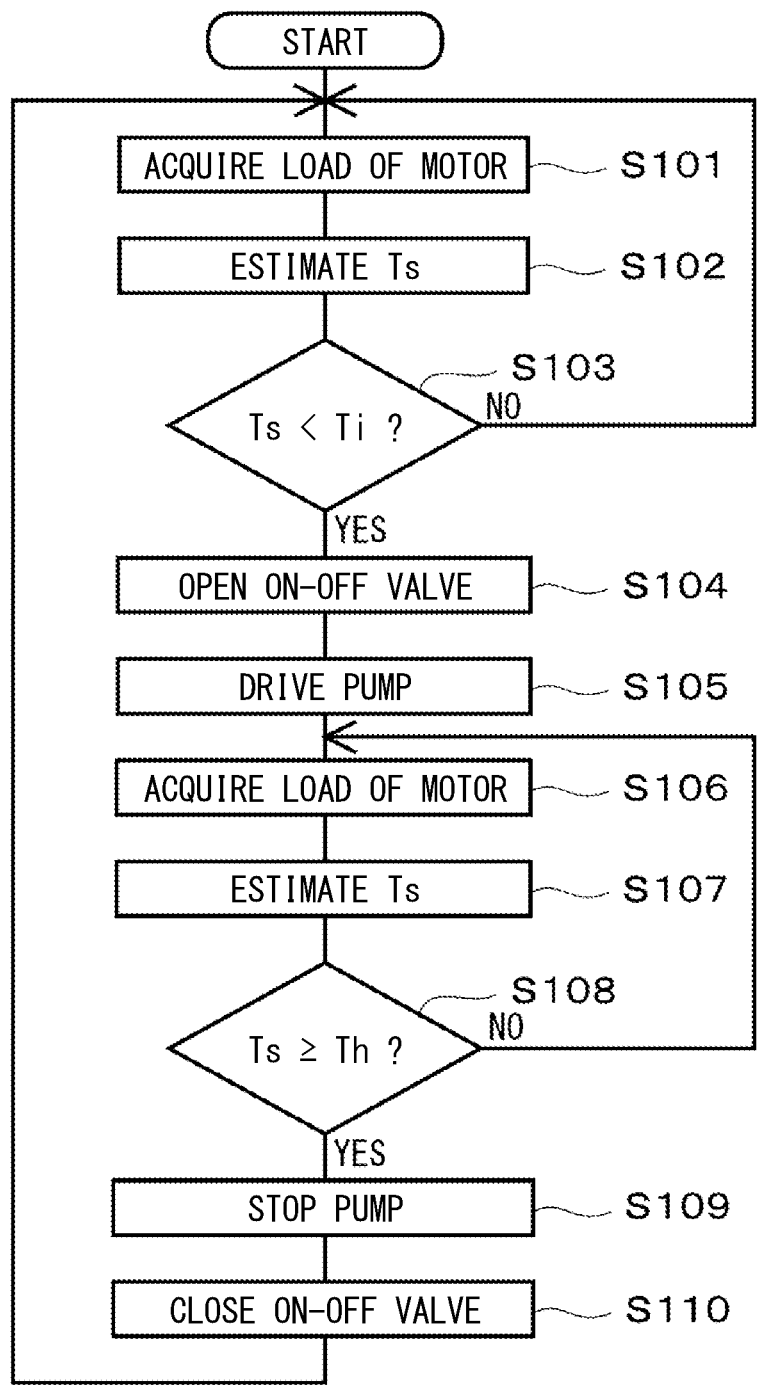
FIG. 4 is a flow chart showing a flow of processing for the hot water supply device of the embodiment.

The flow of reheating procedure in the hot water supply device 10 will be described with reference to FIG. 4.

The drive amount acquisition unit 51 acquires the load of the motor 43 (S101). The drive amount acquisition unit 51 acquires, for example, the voltage applied to the motor 43, the current supplied to the motor 43, the number of rotations of the motor 43, the rotation angle of the motor 43, and the like as the load of the motor 43. The drive amount acquisition unit 51 may acquire values other than the above examples as the load of the motor 43. Further, the load of the motor 43 acquired by the drive amount acquisition unit 51 may be one of the examples and the others, or two or more of the examples and the others.

The controller 52 estimates the temperature Ts of the supply water based on the load of the motor 43 acquired by the drive amount acquisition unit 51 (S102). As described above, the temperature Ts of the supply water correlates with the load of the motor 43. Therefore, the controller 52 estimates the temperature Ts of the supply water in the vicinity of the mixing valve unit 14. That is, the controller 52 estimates the temperature Ts of the supply water remaining in the water channel 13 in the vicinity of the mixing valve unit 14, based on the load of the motor 43. Then, the controller 52 determines whether the temperature Ts of the supply water estimated in S102 is less than the minimum temperature Ti (S103).

When the controller 52 determines that the temperature Ts of the supply water is less than the minimum temperature Ti (S103: Yes), the circulation control unit 56 opens the on-off valve 23 (S104) and drives the pump 22 (S105). That is, when the temperature Ts of the supply water remaining in the water channel 13 is less than the minimum temperature Ti, the mixed water cannot have the set temperature Td even if the unheated water and the supply water are mixed. Therefore, the controller 52 determines that it is necessary to reheat the supply water remaining in the water channel 13. When it is determined that the supply water needs to be reheated, the circulation control unit 56 opens the on-off valve 23 to connect the water channel 13 to the connection passage 21. At the same time, the circulation control unit 56 drives the pump 22 to return the supply water remaining in the water channel 13 to the heater 11 via the connection passage 21. As a result, the supply water remaining in the water channel 13 is returned to the heater 11 and reheated. When the controller 52 determines in S103 that the temperature Ts of the supply water is equal to or higher than the minimum temperature Ti (S103: No), the controller 52 returns to S101 and executes the processing after S101.

The drive amount acquisition unit 51 acquires the load of the motor 43 at preset time intervals (S106). The controller 52 estimates the temperature Ts of the supply water based on the load of the motor 43 acquired by the drive amount acquisition unit 51 (S107), and determines whether the estimated temperature Ts is equal to or higher than a heating temperature Th. (S108). When the controller 52 determines that the temperature Ts of the supply water is equal to or higher than the heating temperature Th (S108: Yes), the circulation control unit 56 stops the pump 22 (S109), and the circulation control unit 56 closes the on-off valve 23 (S110). Alternatively, the circulation control unit 56 closes the on-off valve 23, and stops the pump 22. That is, when the temperature Ts of the supply water is equal to or higher than the heating temperature Th, the temperature Ts of the supply water in the water channel 13 is sufficient for producing the mixed water having the set temperature Td. Therefore, the controller 52 determines that the reheating of the supply water is stopped. When it is determined that the reheating of the supply water is stopped, the circulation control unit 56 closes the on-off valve 23 to shut off the water channel 13 from the connection passage 21. At the same time, the circulation control unit 56 stops the pump 22 and ends the reheating of the supply water. When the controller 52 determines in S108 that the temperature Ts of the supply water is lower than the heating temperature Th (S108: No), the controller 52 returns to S106 and executes the processing after S106.

When the controller 52 stops the pump 22 in S109 and closes the on-off valve 23 in S110 to finish reheating the supply water, the controller 52 returns to S101. Then, the controller 52 executes the processing after S101.

According to the embodiment, the hot water supply device 10 includes the drive amount acquisition unit 51. The drive amount acquisition unit 51 detects the load of the motor 43 as the drive amount of the drive unit 32 that drives the valve member 31 in the mixing valve unit 14. The valve member 31 of the mixing valve unit 14 is driven by the drive unit 32 in order to change the mixing ratio of the supplied water and the unheated water. Therefore, the drive amount of the drive unit 32 correlates with the temperature Ts of the supply water. That is, the drive amount acquisition unit 51 indirectly acquires the temperature Ts of the supply water from the drive amount of the drive unit 32. The controller 52 estimates the temperature Ts of the supply water in the mixing valve unit 14 from the drive amount of the drive unit 32 acquired by the drive amount acquisition unit 51, and controls the circulation mechanism 15 including the pump 22 that returns the supply water from the water channel 13 to the heater 11. The mixing valve unit 14 is also provided in the existing hot water supply device 10, and the drive unit 32 is also provided in the existing mixing valve unit 14 for driving the valve member 31. Therefore, the temperature Ts of the supply water in the mixing valve unit 14 can be acquired from the drive unit 32 of the existing mixing valve unit 14 without adding a new member. Further, since the mixing valve unit 14 is provided so as to be exposed outside in each of the facilities 12, the work and the maintenance are easy. The drive amount acquisition unit 51 acquires the temperature Ts of the supply water in the mixing valve unit 14 from the drive amount of the drive unit 32. Therefore, the temperature of the supply water in the vicinity of the mixing valve unit 14 can be detected with high accuracy, without the need for additional parts, while being applied to the existing equipment easily in the work and the maintenance.

Further, in the embodiment, the drive amount acquisition unit 51 and the controller 52 are wirelessly connected to each other so as to be able to communicate with each other. That is, the drive amount acquisition unit 51 wirelessly transmits the acquired load of the motor 43 to the controller 52. The temperature of the supply water in the vicinity of the mixing valve unit 14 can be wirelessly acquired without providing wiring between the drive amount acquisition unit 51 and the controller 52. Therefore, the work and the maintenance are easy while being applied to an existing facility.

OTHER EMBODIMENTS

The present disclosure is not limited to the embodiment, and can be applied to various embodiments without departing from the spirit of the disclosure.

In the embodiment, the drive amount acquisition unit 51 and the controller 52 are wirelessly connected with each other. However, the drive amount acquisition unit 51 and the controller 52 may be connected by wire. For example, in the existing hot water supply device 10, when the mixing valve unit 14 and the controller 52 are already connected by wire, the drive amount acquisition unit 51 and the controller 52 may communicate with each other using the existing wire.

Further, in the embodiment, the drive amount acquisition unit 51 acquires the load of the motor 43 of the mixing valve unit 14. However, the drive amount acquisition unit 51 may be configured to acquire information such as expansion, contraction and/or the total length of the first elastic member 41 or the second elastic member 42 instead of the load of the motor 43. The first elastic member 41 or the second elastic member 42 expands or contracts depending on the temperature Ts of the supply water, and the total length changes. That is, the expansion or contraction of the first elastic member 41 or the second elastic member 42 correlates with the temperature Ts of the supply water. Therefore, the drive amount acquisition unit 51 acquires information on expansion or contraction of either or both of the first elastic member 41 and the second elastic member 42 as the drive amount by using, for example, a position sensor or an electric resistance. The temperature Ts of the supply water may be estimated based on the expansion or contraction information. In these cases, the first elastic member 41 or the second elastic member 42 corresponds to an elastic member.

What is claimed is:

1. A hot water supply device comprising:
   a heater;
   a water channel through which a supply water heated by the heater flows;
   a mixing valve unit disposed in the water channel, the mixing valve unit having a valve member and a drive unit configured to drive the valve member so as to change a mixing ratio of the supply water and unheated water not heated by the heater to produce mixed water with a preset temperature;
   a circulation mechanism disposed in the water channel, the circulation mechanism having
     a connection passage that connects the water channel to the heater by being branched from a part of the water channel between the mixing valve unit and the heater,
     an on-off valve that opens and closes the connection passage, and
     a pump configured to return the supply water remaining in the water channel through the connection passage to the heater;
   a drive amount acquisition unit that acquires a drive amount of the drive unit; and
   a controller that controls the circulation mechanism based on the drive amount acquired by the drive amount acquisition unit.

2. The hot water supply device according to claim 1, wherein
   the drive unit has a motor that drives the valve member, and
   the drive amount acquisition unit acquires a load of the motor.

3. The hot water supply device according to claim 1, wherein
   the drive unit has an elastic member that expands or contracts by movement of the valve member, and
   the drive amount acquisition unit acquires an expansion or contraction information of the elastic member.

4. The hot water supply device according to claim 1, wherein the drive amount acquisition unit transmits the acquired drive amount wirelessly to the controller.

* * * * *